United States Patent
Jiang

(10) Patent No.: US 12,283,658 B2
(45) Date of Patent: Apr. 22, 2025

(54) ELECTROCHEMICAL APPARATUS, PREPARATION METHOD THEREOF, AND ELECTRONIC APPARATUS

(71) Applicant: Ningde Amperex Technology Limited, Ningde (CN)

(72) Inventor: Chenxi Jiang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 125 days.

(21) Appl. No.: 17/472,802

(22) Filed: Sep. 13, 2021

(65) Prior Publication Data
US 2022/0200043 A1   Jun. 23, 2022

(30) Foreign Application Priority Data
Dec. 23, 2020   (CN) .................. 202011539531.X

(51) Int. Cl.
| | | |
|---|---|---|
| *H01M 10/0562* | (2010.01) | |
| *H01M 4/02* | (2006.01) | |
| *H01M 4/38* | (2006.01) | |
| *H01M 4/505* | (2010.01) | |

(Continued)

(52) U.S. Cl.
CPC ....... *H01M 10/0562* (2013.01); *H01M 4/386* (2013.01); *H01M 4/505* (2013.01); *H01M 4/525* (2013.01); *H01M 10/0585* (2013.01); *H01M 2004/027* (2013.01); *H01M 2004/028* (2013.01); *H01M 2300/008* (2013.01)

(58) Field of Classification Search
CPC ..... H01M 4/36–628; H01M 2300/008; H01M 10/0562; H01M 4/386; H01M 4/505; H01M 4/525; H01M 10/0585; H01M 2004/027; H01M 2004/028
See application file for complete search history.

(56) References Cited

U.S. PATENT DOCUMENTS

| | | | |
|---|---|---|---|
| 2019/0252672 A1* | 8/2019 | Miyagi et al. | ........ H01M 4/131 |
| 2019/0288273 A1 | 9/2019 | Yang et al. | |

(Continued)

FOREIGN PATENT DOCUMENTS

| | | |
|---|---|---|
| CN | 102637903 A | 8/2012 |
| CN | 105655644 A | 6/2016 |
| CN | 109921093 A | 6/2019 |

(Continued)

OTHER PUBLICATIONS

Liu et al., CN 111628225 A, Sep. 2020, EPO machine translation. (Year: 2020).*

(Continued)

*Primary Examiner* — Haroon S. Sheikh
*Assistant Examiner* — Kan Luo
(74) *Attorney, Agent, or Firm* — Ladas & Parry LLP

(57) ABSTRACT

An electrochemical apparatus includes a positive electrode plate including a positive electrode active material layer; a negative electrode plate including a negative electrode active material layer; and a separator disposed between the positive electrode plate and the negative electrode plate. A mass ratio of fluorine to sulfur in a surface layer of the positive electrode active material layer is A, and a mass ratio of fluorine to sulfur in a surface layer of the negative electrode active material layer is B, where $30 \leq A \leq 300$, and $5 \leq B \leq 50$.

20 Claims, 1 Drawing Sheet

(51) Int. Cl.
*H01M 4/525* (2010.01)
*H01M 10/0585* (2010.01)

(56) References Cited

U.S. PATENT DOCUMENTS

2019/0326625 A1  10/2019  Cheng et al.
2020/0161706 A1*  5/2020  Cao et al. ......... H01M 10/0567

FOREIGN PATENT DOCUMENTS

| | | | | |
|---|---|---|---|---|
| CN | 110875499 A | | 3/2020 | |
| CN | 111628225 A | * | 9/2020 | ............ H01M 10/58 |
| JP | 2013110017 A | | 6/2013 | |
| JP | 2015028875 A | | 2/2015 | |
| WO | 2020149199 A1 | | 7/2020 | |

OTHER PUBLICATIONS

Chinese Office Action corresponding to counterpart application 202011539531.X dated Oct. 9, 2021.
Extended European Search Report for Application No. EP21198487, dated Mar. 16, 2022, 10 pages.

* cited by examiner

ELECTROCHEMICAL APPARATUS, PREPARATION METHOD THEREOF, AND ELECTRONIC APPARATUS

CROSS REFERENCE TO RELATED APPLICATION

The present application claims priority to China Patent Application Serial No. 202011539531.X, filed on Dec. 23, 2020, the disclosure of which is incorporated herein by reference in its entirety.

TECHNICAL FIELD

This application relates to the field of electronic technologies, and in particular, to an electrochemical apparatus, a preparation method thereof, and an electronic apparatus.

BACKGROUND

In recent years, the rapid developments of electronic products and electric vehicles have imposed higher requirements on cycling performance of electrochemical apparatuses (for example, lithium-ion batteries). Although there are various methods for improving cycle performance of electrochemical apparatuses, these methods are not completely satisfactory in every aspect. Therefore, further improvements in this aspect are desired.

SUMMARY

Embodiments of this application provide an electrochemical apparatus, including: a positive electrode plate, where the positive electrode plate includes a positive electrode active material layer; a negative electrode plate, where the negative electrode plate includes a negative electrode active material layer; and a separator, where the separator is disposed between the positive electrode plate and the negative electrode plate. In some embodiments, a mass ratio of fluorine to sulfur in a surface layer of the positive electrode active material layer is A, and a mass ratio of fluorine to sulfur in a surface layer of the negative electrode active material layer is B, where $30 \leq A \leq 300$, and $5 \leq B \leq 50$.

In some embodiments, $0.05 \leq B/A \leq 0.2$.

In some embodiments, a thickness of the surface layer of the positive electrode active material layer is 10 nm. In some embodiments, a thickness of the surface layer of the negative electrode active material layer is 10 nm. In some embodiments, the surface layer of the positive electrode active material layer does not include a positive electrode active material. In some embodiments, the surface layer of the negative electrode active material layer does not include a negative electrode active material.

In some embodiments, the electrochemical apparatus further includes an electrolyte, and the electrolyte includes at least one of a fluorine-containing compound or a sulfur-containing compound.

In some embodiments, the fluorine-containing compound includes at least one of fluoroethylene carbonate, trifluoropropylene carbonate, trifluoroethyl methyl carbonate, fluorocarboxylate, or fluoroether.

In some embodiments, the sulfur-containing compound includes at least one of ethylene sulfite, vinyl sulfate, butane sultone, 1-propenyl-1,3-sulfonate, or 1,3-propane sultone.

In some embodiments, the negative electrode plate includes a negative electrode active material; the negative electrode active material includes a silicon material; and the silicon material includes at least one of silicon, a silicon-oxygen compound, a silicon-carbon compound, or a silicon alloy.

In some embodiments, the positive electrode plate includes a positive electrode active material; and the positive electrode active material includes at least one of lithium cobalt oxide, lithium nickel cobalt manganese oxide, or lithium nickel cobalt aluminum oxide, and when a state of charge of the electrochemical apparatus is 100%, an open-circuit voltage of the electrochemical apparatus is greater than or equal to 4.15 V. In some embodiments, the positive electrode active material includes the lithium cobalt oxide, and when the state of charge of the electrochemical apparatus is 100%, the open-circuit voltage of the electrochemical apparatus is greater than or equal to 4.35 V.

Another embodiment of this application further provides an electronic apparatus, including the foregoing electrochemical apparatus.

Still another embodiment of this application provides a preparation method of an electrochemical apparatus. The preparation method includes:

pre-lithiating a negative electrode plate of the electrochemical apparatus; adding a first electrolyte to the electrochemical apparatus to perform a first formation step, where the first electrolyte includes a first fluorine-containing compound; and adding a second electrolyte to the electrochemical apparatus to perform a second formation step, where the second electrolyte includes a second fluorine-containing compound and a sulfur-containing compound.

In some embodiments, the first fluorine-containing compound includes at least one of fluoroethylene carbonate, trifluoropropylene carbonate, trifluoroethyl methyl carbonate, fluorocarboxylate, or fluoroether. In some embodiments, the second fluorine-containing compound includes at least one of fluoroethylene carbonate, trifluoropropylene carbonate, trifluoroethyl methyl carbonate, fluorocarboxylate, or fluoroether.

In some embodiments, the sulfur-containing compound includes at least one of ethylene sulfite, vinyl sulfate, butane sultone, 1-propenyl-1,3-sulfonate, or 1,3-propane sultone.

In some embodiments, based on a mass of the first electrolyte, a mass percentage of the first fluorine-containing compound is 5% to 40%. In some embodiments, based on a mass of the second electrolyte, a mass percentage of the second fluorine-containing compound is 5% to 40%. In some embodiments, based on a mass of the second electrolyte, a mass percentage of the sulfur-containing compound is 1% to 6%.

In this application, the mass ratios of fluorine to sulfur in the surface layers of the positive electrode active material layer and the negative electrode active material layer are controlled, so that a stable negative-electrode solid electrolyte interphase (SEI) film is formed on a surface of the negative electrode, and a stable positive-electrode cathode electrolyte interphase (CEI) film is formed on a surface of the positive electrode, thereby improving cycle performance of the electrochemical apparatus.

DETAILED DESCRIPTION

The following embodiments may enable those skilled in the art to understand this application more comprehensively, but do not limit this application in any way.

Figure 1:
FIG. 1 is an expanded sectional view of an electrochemical apparatus according to an embodiment of this application.

Some embodiments of this application provide an electrochemical apparatus. FIG. 1 is an expanded sectional view of an electrochemical apparatus according to an embodiment of this application. The electrochemical apparatus includes a positive electrode plate 10, a negative electrode plate 12, and a separator 11 disposed between the positive electrode plate 10 and the negative electrode plate 12. In some embodiments, the positive electrode plate 10, the negative electrode plate 12, and the separator 11 are wound or laminated to form an electrode assembly, and the electrode assembly is accommodated in a case.

Figure 2:
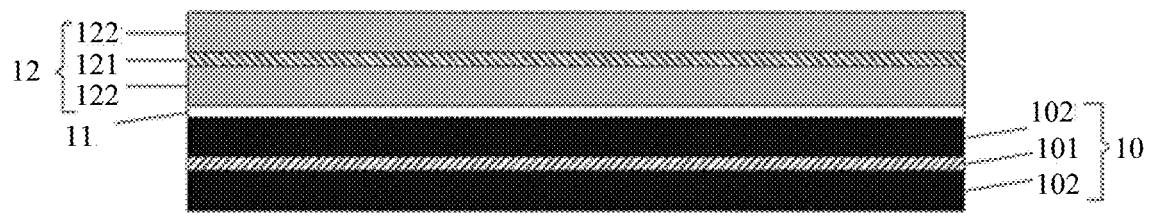
FIG. 2 is a more detailed view of the electrochemical apparatus of FIG. 1 according to an embodiment of this application.

As shown in FIG. 2, in some embodiments, the positive electrode plate 10 may include a positive electrode current collector 101 and a positive electrode active material layer 102 coated on the positive electrode current collector 101. It should be understood that although FIG. 2 shows that positive electrode active material layers 102 are provided on both sides of the positive electrode current collector 101, in some embodiments, the positive electrode active material layer 102 may be provided on only one side of the positive electrode current collector 101. In addition, in some embodiments, the positive electrode plate 10 may include only the positive electrode active material layer 102 but no positive electrode current collector 101. In some embodiments, the negative electrode plate 12 may include a negative electrode current collector 121 and a negative electrode active material layer 122 coated on the negative current collector 121. It should be understood that although FIG. 2 shows that the negative electrode active material layers 122 are provided on both sides of the negative electrode current collector 121, in some embodiments, the negative electrode active material layer 122 may be provided on only one side of the negative electrode current collector 121. In addition, in some embodiments, the negative electrode plate 12 may include only the negative electrode active material layer 122 but no negative electrode current collector 121.

Generally, the stability of a negative-electrode solid electrolyte interphase (SEI, Solid Electrolyte Interphase) film and a positive-electrode cathode electrolyte interphase (CEI, Cathode Electrolyte Interphase) film greatly affects cycle performance of the electrochemical apparatus. To form a stable SEI film, some negative electrode film-forming additives, such as fluoroethylene carbonate (FEC), are added to an electrolyte. In addition, to form a stable CEI film, some positive electrode film-forming additives, such as sulfur-containing compounds, are added to the electrolyte. However, the sulfur-containing compound is easily reduced on a surface of the negative electrode, and a reduction product may deteriorate performance of the SEI film of the negative electrode and thereby degrade the cycle performance of the electrochemical apparatus.

Therefore, this application can use a method of pre-lithiating the negative electrode and performing multi-step electrolyte injection for formation. An electrolyte injected the first time includes a first fluorine-containing compound but no sulfur-containing compound, so that a stable SEI film is first formed on the surface of the negative electrode. An electrolyte injected the second time includes a second fluorine-containing compound and a sulfur-containing compound, so that a CEI film is formed on the surface of the positive electrode. Since two electrolytes are added separately and no sulfur-containing compound is contained in the first electrolyte, the risk that a reduction reaction of a sulfur-containing compound on the surface of the negative electrode affects formation of the SEI film is reduced. The SEI film on the negative electrode and the CEI film on the positive electrode can be separately regulated, thereby reducing deterioration of the SEI film of the negative electrode by a sulfur-containing compound, and obtaining a stable CEI film on the positive electrode and a stable SEI film on the negative electrode. The SEI film on the negative electrode contains fluorine by containing the negative electrode film-forming additive, the FEC, and the CEI film on the positive electrode contains sulfur by containing the positive electrode film-forming additive, the sulfur-containing compound. Therefore, appropriate mass ratio of fluorine to sulfur in surface layer of the positive electrode active material layer and appropriate mass ratio of fluorine in surface layer of the negative electrode active material layer are reached by obtaining the stable CEI film on the positive electrode and the stable SEI film on the negative electrode.

In some embodiments, a mass ratio of fluorine to sulfur in a surface layer of the positive electrode active material layer 102 is A, where $30 \leq A \leq 300$. In some embodiments, the surface layer of the positive electrode active material layer 102 is a positive-electrode cathode electrolyte interphase (CEI, Cathode Electrolyte Interphase) film formed on the surface of the positive electrode active material layer 102.

In some embodiments, the fluorine-containing compound containing fluorine in the electrolyte can help form a stable negative-electrode solid electrolyte interphase (SEI, Solid Electrolyte Interphase) film on the surface of the negative electrode, and the sulfur-containing compound containing sulfur in the electrolyte can help form a stable CEI film on the surface of the positive electrode. However, the sulfur-containing compound containing sulfur is easily reduced on the surface of the negative electrode, and the reduction product may deteriorate the stability of the SEI film on the surface of the negative electrode and thereby impair the cycle performance of the electrochemical apparatus. When A is too small, for example, less than 30, it indicates that there is a too small amount of fluorine-containing compound or a too large amount of sulfur-containing compound, which is not conducive to formation of a stable SEI film on the surface of the negative electrode, and the excessive sulfur-containing compound may be reduced on the surface of the negative electrode and deteriorate the stability of the SEI film on the surface of the negative electrode. When A is too large, for example, greater than 300, it indicates that there is a too small amount of sulfur-containing compound or a too large amount of fluorine-containing compound, which is not conducive to formation of a stable CEI film on the surface of the positive electrode. In addition, the fluorine-containing compound has poor oxidation resistance, and the excessive fluorine-containing compound is easily oxidized at the high-voltage positive electrode, deteriorating performance of the positive electrode. In addition, the insufficient sulfur-containing compound makes it impossible to effectively protect stability of the CEI film on the surface of the positive electrode, and also causes the high-voltage positive electrode to fail.

In some embodiments, a mass ratio of fluorine to sulfur in a surface layer of the negative electrode active material layer 122 is B, where $5 \leq B \leq 50$. When B is too small, for example, less than 5, it indicates that there is a too small amount of fluorine-containing compound or a too large amount of sulfur-containing compound, which is not conducive to formation of a stable SEI film on the surface of the negative electrode, and the excessive sulfur-containing compound may be reduced on the surface of the negative electrode and deteriorate the stability of the SEI film on the surface of the negative electrode. When B is too large, for example, greater than 50, it indicates that there is a too small amount of sulfur-containing compound or a too large amount of fluorine-containing compound, which is not conducive to formation of a stable CEI film on the surface of the positive electrode, and the excessive fluorine-containing compound is easily oxidized at the high-voltage positive electrode, deteriorating the performance of the positive electrode. In addition, the insufficient sulfur-containing compound makes it impossible to effectively protect stability of the CEI film on the surface of the positive electrode, and also causes the high-voltage positive electrode to fail.

In some embodiments, to ensure that the mass ratio of fluorine to sulfur in the surface layer of the positive electrode active material layer 102 is A, and the mass ratio of fluorine to sulfur in the surface layer of the negative electrode active material layer 122 is B, where $30 \leq A \leq 300$, and $5 \leq B \leq 50$, two electrolytes may be injected separately. The first electrolyte injected contains a first fluorine-containing compound but no sulfur-containing compound. A stable SEI film is first formed on the surface of the negative electrode, and then a second electrolyte containing a second fluorine-containing compound and a sulfur-containing compound is injected to form a CEI film on the surface of the positive electrode. Since two electrolytes are added separately and no sulfur-containing compound is contained in the first electrolyte, the risk that a sulfur-containing compound undergoes a reduction reaction on the surface of the negative electrode to affect formation of the SEI film is reduced, which causes failure to obtain a stable SEI film and failure to reach $30 \leq A \leq 300$ and $5 \leq B \leq 50$.

In some embodiments, $0.05 \leq B/A \leq 0.2$. A cycling retention rate of the electrochemical apparatus is improved by making $0.05 \leq B/A \leq 0.2$.

In some embodiments, a thickness of the surface layer of the positive electrode active material layer 102 is 10 nm. In some embodiment, a thickness of the surface layer of the negative electrode active material layer 122 is 10 nm. As described above, the surface layer of the positive electrode active material layer 102 is the CEI film formed on the surface of the positive electrode, and the surface layer of the negative electrode active material layer 122 is the SEI film formed on the surface of the negative electrode. When the thickness of each of the surface layer of the positive electrode active material layer 102 and the surface layer of the negative electrode active material layer 122 is 10 nm, side reactions between the electrolyte and the positive electrode active material layer or the negative electrode active material layer can be reduced, and the passing of lithium ions can also be ensured.

In some embodiments, the surface layer of the positive electrode active material layer 102 does not include a positive electrode active material. As described above, the surface layer of the positive electrode active material layer 102 is a product formed by the reaction of the electrolyte with the positive electrode active material, rather than the positive electrode active material. In some embodiments, the surface layer of the negative electrode active material layer 122 does not include a negative electrode active material. As described above, the surface layer of the negative electrode active material layer 122 is a product formed by the reaction of the electrolyte with the negative electrode active material, rather than the negative electrode active material.

In some embodiments, the electrochemical apparatus further includes an electrolyte, and the electrolyte includes at least one of a fluorine-containing compound or a sulfur-containing compound. In some embodiments, the fluorine-containing compound may help form a stable SEI film on the surface of the negative electrode, and the sulfur-containing compound may help form a stable CEI film on the surface of the positive electrode.

In some embodiments, the first fluorine-containing compound includes at least one of fluoroethylene carbonate, trifluoropropylene carbonate, trifluoroethyl methyl carbonate, fluorocarboxylate, or fluoroether. In some embodiments, the sulfur-containing compound includes at least one of ethylene sulfite, vinyl sulfate, butane sultone, 1-propenyl-1, 3-sulfonate, or 1,3-propane sultone. In some embodiments, the second fluorine-containing compound includes at least one of fluoroethylene carbonate, trifluoropropylene carbonate, trifluoroethyl methyl carbonate, fluorocarboxylate, or fluoroether. In some embodiments, the sulfur-containing compound includes at least one of ethylene sulfite, vinyl sulfate, butane sultone, 1-propenyl-1,3-sulfonate, or 1,3-propane sultone.

In some embodiments, based on the mass of the first electrolyte, a mass percentage of the first fluorine-containing compound in the electrolyte is 5% to 40%. In some embodiments, based on the mass of the second electrolyte, a mass percentage of the second fluorine-containing compound in the electrolyte is 5% to 40%. If a percentage of the first fluorine-containing compound or the second fluorine-containing compound is excessively low, for example, less than 5%, a stable SEI film may not be able to be formed on the surface of the negative electrode, or the SEI film damaged during cycling cannot be fixed in time, thereby affecting cycle performance of the electrochemical apparatus. If a percentage of the first fluorine-containing compound or the second fluorine-containing compound is excessively high, for example, higher than 40%, the first fluorine-containing compound or the second fluorine-containing compound may be oxidized at the high-voltage positive electrode, deteriorating performance of the positive electrode.

In some embodiments, based on the mass of the electrolyte, a mass percentage of the sulfur-containing compound in the electrolyte is 1% to 6%. If a percentage of the sulfur-containing compound is excessively low, for example, less than 1%, it may not have a good protective effect on the positive electrode, that is, a stable CEI film cannot be formed on the surface of the positive electrode. If a percentage of the sulfur-containing compound is excessively high, for example, higher than 6%, the excessive sulfur-containing compound may undergo a reduction reaction on the surface of the negative electrode, and the reduction product may deteriorate the stability of the SEI film on the surface of the negative electrode, thereby affecting cycle performance of the electrochemical apparatus.

In some embodiments, the negative electrode plate 12 includes a negative electrode active material, the negative electrode active material includes a silicon material, and the silicon material includes at least one of silicon, a silicon-oxygen compound, a silicon-carbon compound, or a silicon alloy. A sulfur-containing compound additive in the electrolyte is easily reduced on a surface of a silicon negative electrode, and a reduction product may deteriorate performance of the SEI film, thereby accelerating cycling degradation of the silicon negative electrode. A stable SEI film is formed on the surface of the silicon negative electrode by pre-lihiating the negative electrode, and first injecting the electrolyte containing no sulfur compound additive and then injecting the electrolyte containing sulfur compound additive during formation.

In some embodiments, the positive electrode active material layer 102 includes a positive electrode active material, and the positive electrode active material includes at least one of lithium cobalt oxide, lithium nickel cobalt manganese oxide, or lithium nickel cobalt aluminum oxide, and when a state of charge (SOC, state of charge) of the electrochemical apparatus is 100%, an open-circuit voltage of the electrochemical apparatus is greater than or equal to 4.15 V. In some embodiments, the positive electrode active material includes lithium cobalt oxide, and when the SOC of the electrochemical apparatus is 100%, the open-circuit voltage of the electrochemical device is greater than or equal to 4.35 V. In other words, this embodiment of this application is applicable to the high-voltage positive electrode. Generally, for ternary positive electrode active materials such as lithium nickel cobalt manganese oxide and lithium nickel cobalt aluminum oxide, 4.15 V or higher may be considered a high voltage. For the positive electrode active material of lithium cobalt oxide, 4.35 V or higher may be considered a high voltage.

In some embodiments, the current collector 121 of the negative electrode plate 12 may include at least one of copper foil, aluminum foil, nickel foil, or a carbon-based current collector. In some embodiments, the negative electrode active material layer 122 may further include a conductive agent and/or a binder. In some embodiments, the conductive agent includes at least one of conductive carbon black, acetylene black, carbon nanotube, Ketjen black, conductive graphite, or graphene. In some embodiments, a mass percentage of the conductive agent in the negative electrode active material layer 122 is 0.5% to 10%. In some embodiments, the binder includes at least one of polyvinylidene fluoride, a vinylidene fluoride-hexafluoropropylene copolymer, polyamide, polyacrylonitrile, polyropylene, polyacrylic acid, polyacrylate, sodium carboxymethylcellulose, polyvinylpyrrolidone, polyvinyl ether, polymethyl methacrylate, polytetrafluoroethylene, polyhexafluoropropylene, or styrene-butadiene rubber. In some embodiments, a mass percentage of the binder in the negative electrode active material layer 122 is 0.5% to 10%. It should be understood that the above is only exemplary and not intended to limit this application.

In some embodiments, the positive electrode active material layer 102 may include a positive electrode active material, a conductive agent, and a binder. The positive electrode current collector 101 may use Al foil, or may use another positive electrode current collector commonly used in the art. The conductive agent in the positive electrode plate 10 may include at least one of conductive carbon black, laminated graphite, graphene, carbon nanotubes, or carbon fiber. The binder in the positive electrode plate 10 may include at least one of polyvinylidene fluoride, a vinylidene fluoride-hexafluoropropylene copolymer, styrene-acrylate copolymer, styrene-butadiene copolymer, polyamide, polyacrylonitrile, polyacrylate, polyacrylic acid, polyacrylate, sodium carboxymethylcellulose, polyvinyl acetate, polyvinylpyrrolidone, polyvinyl ether, polymethyl methacrylate, polytetrafluoroethylene, or polyhexafluoropropylene. The positive electrode active material includes, but is not limited to, at least one of lithium cobaltate, lithium nickelate, lithium manganate, lithium nickel manganate, lithium iron phosphate, lithium nickel cobalt aluminate, or lithium nickel cobalt manganate. The foregoing positive electrode active material may be doped or coated.

In some embodiments, the separator 11 includes at least one of polyethylene, polypropylene, polyvinylidene fluoride, polyethylene terephthalate, polyimide, or aramid. For example, polyethylene includes at least one of high-density polyethylene, low-density polyethylene, or ultra-high-molecular-weight polyethylene. Particularly, polyethylene and polypropylene have a good effect on preventing short circuits, and can improve the stability of a battery through a shutdown effect. In some embodiments, thickness of the separator ranges from about 5 μm to 500 μm.

In some embodiments, a surface of the separator may further include a porous layer. The porous layer is disposed on at least one surface of the separator and includes inorganic particles and a binder. The inorganic particles are selected from at least one of aluminum oxide ($Al_2O_3$), silicon oxide ($SiO_2$), magnesium oxide (MgO), titanium oxide ($TiO_2$), hafnium oxide ($HfO_2$), stannic oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a pore diameter of the separator ranges from about 0.01 μm to 1 μm. The binder is selected from at least one of polyvinylidene fluoride, a vinylidene fluoride-hexafluoropropylene copolymer, polyamide, polyacrylonitrile, poly acrylate, polyacrylic acid, polyacrylate, sodium carboxymethylcellulose, polyvinylpyrrolidone, polyvinyl ether, polymethyl methacrylate, polytetrafluoroethylene, or polyhexafluoropropylene. The porous layer on the surface of the separator may improve heat resistance, oxidation resistance, and electrolyte infiltration performance of the separator, and enhance cohesiveness between the separator and the electrode plate.

In some embodiments, the electrochemical apparatus includes a lithium-ion battery. However, this application is not limited thereto. In some embodiments, the electrolyte may further include at least two of dimethyl carbonate (DMC), ethyl methyl carbonate (EMC), diethyl carbonate (DEC), ethylene carbonate (EC), propylene carbonate (PC), or propyl propionate (PP). In some embodiments, the electrolyte may further include a lithium salt.

In some embodiments of this application, a lithium-ion battery is used as an example. A positive electrode plate, a separator, and a negative electrode plate are wound or stacked in sequence to form an electrode assembly, the electrode assembly is then packaged in an aluminum-plastic film and the negative electrode is pre-lithiated, followed by injection of an electrolyte for formation, and packaging, so that the lithium-ion battery is prepared. Those skilled in the art will understand that the preparation method of the electrochemical apparatus (for example, lithium-ion battery) described above is merely an example. Without departing from the content of the disclosure of this application, other methods commonly used in the art may be used.

In some embodiments, an embodiment of this application further provides a preparation method of an electrochemical apparatus. As described above, the electrochemical apparatus includes the positive electrode plate 10, the negative electrode plate 12, and the separator 11, where the separator 11 is disposed between the positive electrode plate 10 and the negative electrode plate 12. The preparation method includes pre-lithiating the negative electrode plate. Specifically, a layer of lithium metal may be provided on a surface of the negative electrode active material layer 122 away from the negative electrode current collector 121. In some embodiments, the negative electrode plate (especially the negative electrode plate including a silicon-based material) itself has low first cycle efficiency, and the first cycle efficiency of the corresponding electrochemical apparatus can be improved through prelithiation.

Then, a first electrolyte is added to the electrochemical apparatus to perform a first formation step, where the first electrolyte includes a first fluorine-containing compound but no sulfur-containing compound. In this case, because the surface of the negative electrode active material layer 122 away from the negative electrode current collector 121 includes lithium metal, a SEI film can be formed on the surface of the negative electrode after a self formation without additional charging formation step, saving process costs. In addition, no CEI film has been formed on the surface of the positive electrode at this point. Because the first electrolyte includes no sulfur-containing compound, when the first fluorine-containing compound facilitates formation of the SEI film on the surface of the negative electrode, no sulfur-containing compound is reduced at the negative electrode. Therefore, the formation of the SEI film will not be damaged.

Then, a second electrolyte is added to the electrochemical apparatus to perform a second formation step, where the second electrolyte includes a second fluorine-containing compound and a sulfur-containing compound. In this case, a charging formation can be performed to form a CEI film on the surface of the positive electrode. Because films are separately formed on the positive electrode and the negative electrode, a stable CEI film is formed on the positive electrode and a stable SEI film is formed on the negative electrode. In addition, finally, a mass ratio of fluorine to sulfur on the surface of the positive electrode plate 10 is A, and a mass ratio of fluorine to sulfur on the surface of the negative electrode plate 12 is B, where $30 \leq A \leq 300$ and $5 \leq B \leq 50$. If the films are not formed separately, the formation of the SEI film on the surface of the negative electrode may be damaged by the sulfur-containing compound, and $30 \leq A \leq 300$ and $5 \leq B \leq 50$ cannot be ensured.

In some embodiments, the first fluorine-containing compound includes at least one of fluoroethylene carbonate, trifluoropropylene carbonate, trifluoroethyl methyl carbonate, fluorocarboxylate, or fluoroether. In some embodiments, the sulfur-containing compound includes at least one of ethylene sulfite, vinyl sulfate, butane sultone, 1-propenyl-1,3-sulfonate, or 1,3-propane sultone. In some embodiments, the second fluorine-containing compound includes at least one of fluoroethylene carbonate, trifluoropropylene carbonate, trifluoroethyl methyl carbonate, fluorocarboxylate, or fluoroether. In some embodiments, the sulfur-containing compound includes at least one of ethylene sulfite, vinyl sulfate, butane sultone, 1-propenyl-1,3-sulfonate, or 1,3-propane sultone.

An embodiment of this application further provides an electronic apparatus including the foregoing electrochemical apparatus. The electronic apparatus according to the embodiments of this application is not particularly limited, and may be any known electronic apparatus used in the prior art. In some embodiments, the electronic apparatus may include, but is not limited to: notebook computers, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power supplies, motors, automobiles, motorcycles, assisted bicycles, bicycles, lighting apparatuses, toys, game machines, clocks, electric tools, flashlights, cameras, large household storage batteries or lithium-ion capacitors.

Some specific examples and comparative examples are listed below to better illustrate this application. Lithium-ion batteries are used for illustration.

Example 1

Preparation of a Negative Electrode Plate.

A current collector used copper foil with a thickness of 8 μm; a negative electrode active material used SiO (20 wt %, which is a mass percentage, the same applied below) and graphite (80 wt %), a conductive agent used conductive carbon black, and a binder used polyacrylic acid and sodium carboxymethyl cellulose; and the negative electrode active material, conductive carbon black, polyacrylic acid, and sodium carboxymethyl cellulose were mixed in a weight ratio of 92:2:5:1, and then dispersed in deionized water to form a slurry, and the slurry was uniformly agitated and then applied on copper foil, followed by drying to form a negative electrode active material layer with a coating weight of 5.9 mg/cm$^2$. After drying and cold pressing (with compacted density of 1.5 g/cm$^3$), the negative electrode plate was obtained. The negative electrode plate was pre-lithiated by using lithium metal rolling compositing.

Preparation of a Positive Electrode Plate.

The positive electrode active material LiCoO$_2$, conductive carbon black, and the binder polyvinylidene fluoride (PVDF) were fully agitated and uniformly mixed in an N-methylpyrrolidone solvent system in a mass ratio of 96:1:3, and then the mixture was applied onto aluminum foil with a coating weight of 18.2 mg/cm$^2$, followed by drying and cold pressing (with compacted density of 4.1 g/cm$^3$) to obtain the positive electrode plate.

Preparation of a Separator.

Polyethylene with a thickness of 10 μm was selected as the separator.

Preparation of an Electrolyte.

Under an environment with a water content less than 10 ppm, lithium hexafluorophosphate (1 mol/L) and a non-aqueous organic solvent (ethylene carbonate (EC): propylene carbonate (PC): diethyl carbonate (DEC): dimethyl carbonate (DMC)=20:20:40:20, a weight ratio) were mixed to obtain a basic electrolyte. 20 wt % fluoroethylene carbonate (FEC) was added to an electrolyte 1, and 5 wt % FEC and 1 wt % 1,3-propane sultone (PS) were added to an electrolyte 2.

Preparation of a Lithium-Ion Battery.

The positive electrode plate, the separator, and the negative electrode plate were stacked in sequence, so that the separator was disposed between the positive electrode plate and the negative electrode plate for separation, and winding was performed to obtain an electrode assembly. The electrode assembly was arranged in an outer packaging aluminum-plastic film, and was dehydrated at a temperature of 80° C. Then the above-mentioned electrolyte was injected and packaged, followed by processes such as formation, degassing, and shaping to obtain the lithium-ion battery with a thickness of 3.5 mm, a width of 40 mm, and a length of 95 mm. In the preparation process, a 3 g electrolyte 1 was injected first, where the electrolyte 1 includes 20% wt % FEC but no sulfur-containing compound; then the electrolyte stood at room temperature for 48 hours to form a SEI film through formation, and vacuum degassing and removal of an excessive electrolyte were performed; and then a 6 g electrolyte 2 was injected, where the electrolyte 2 includes 5% wt % FEC and 1% PS wt %. After the electrolyte stood for 48 hours, formation, vacuum degassing and electrolyte removal (removal of an excessive electrolyte), and capacity grading were performed. The process of formation is charging at a constant current of 0.1 C to 3.9 V at 45° C. with a pressure of 0.3 MPa; the process of capacity grading is charging at a constant current of 0.7 C to 4.45 V (upper limit voltage) at 25° C., charging at a constant voltage to a cut-off current of 0.025 C, and then discharging at 0.5 C to 3.0 V.

In Examples 2 to 15 and Comparative Examples 1 to 15, the preparations of the positive electrode plate, separator, negative electrode plate, and lithium-ion battery are the same as those in Example 1 except that the preparation of the electrolyte. The difference in parameters is shown in the corresponding Table 1 below.

In Comparative Example 1, gradual electrolyte injection was not used, only the electrolyte 2 was injected for a corresponding formation, and the electrolyte 2 was added with 20 wt % FEC.

In Comparative Example 2, gradual electrolyte injection was not used, only the electrolyte 2 was injected for a corresponding formation, and the electrolyte 2 was added with 20 wt % FEC and 1 wt % 1,3-propane sultone (PS).

In Comparative Example 3, gradual electrolyte injection was not used, only the electrolyte 2 was injected for a corresponding formation, and the electrolyte 2 was added with 20 wt % FEC and 4 wt % 1,3-propane sultone (PS).

In Examples 16 and 17 and Comparative Example 16, the preparations of the positive electrode plate, separator, negative electrode plate, and lithium-ion battery are the same as those in Example 1, except that the FEC was replaced by trifluoropropylene carbonate, and the sulfur-containing compound was still 1,3-propane sultone. The difference in parameters is shown in the corresponding Table 2 below.

In Examples 18 and 19 and Comparative Example 17, the preparations of the positive electrode plate, separator, negative electrode plate, and lithium-ion battery are the same as those in Example 1, except that the FEC was replaced by trifluoroethyl methyl carbonate, and the sulfur-containing compound was still 1,3-propane sultone. The difference in parameters is shown in the corresponding Table 2 below.

In Examples 20 and 21 and Comparative Example 18, the preparations of the positive electrode plate, separator, negative electrode plate, and lithium-ion battery are the same as those in Example 1, except that the FEC was replaced by ethyl difluoroacetate, and the sulfur-containing compound was still 1,3-propane sultone. The difference in parameters is shown in the corresponding Table 2 below.

In Examples 22 and 23 and Comparative Example 19, the preparations of the positive electrode plate, separator, negative electrode plate, and lithium-ion battery are the same as those in Example 1, except that the FEC was replaced by 1,1,2,2-tetrafluoroethyl-2,2,3,3-tetrafluoropropyl ether, and the sulfur-containing compound was still 1,3-propane sultone. The difference in parameters is shown in the corresponding Table 2 below.

In Examples 24 and 25 and Comparative Example 20, the preparations of the positive electrode plate, separator, negative electrode plate, and lithium-ion battery are the same as those in Example 1, except that the negative electrode film-forming additive was still FEC, and the sulfur-containing compound 1,3-propane sultone was replaced by ethylene sulfite. The difference in parameters is shown in the corresponding Table 2 below.

In Examples 26 and 27 and Comparative Example 21, the preparations of the positive electrode plate, separator, negative electrode plate, and lithium-ion battery are the same as those in Example 1, except that the negative electrode film-forming additive was still FEC, and the sulfur-containing compound 1,3-propane sultone was replaced by vinyl sulfate. The difference in parameters is shown in the corresponding Table 2 below.

In Examples 28 and 29 and Comparative Example 22, the preparations of the positive electrode plate, separator, negative electrode plate, and lithium-ion battery are the same as those in Example 1, except that the negative electrode film-forming additive was still FEC, and the sulfur-containing compound 1,3-propane sultone was replaced by butane sultone. The difference in parameters is shown in the corresponding Table 2 below.

In Examples 30 and 31 and Comparative Example 23, the preparations of the positive electrode plate, separator, negative electrode plate, and lithium-ion battery are the same as those in Example 1, except that the negative electrode film-forming additive was still FEC, and the sulfur-containing compound 1,3-propane sultone was replaced by 1-propenyl-1,3-sultone. The difference in parameters is shown in the corresponding Table 2 below.

Methods for measuring various performance parameters of Examples and Comparative Examples are as follows.

Elemental analysis of a surface layer of the positive electrode or negative electrode active material layer:

XPS (X-ray photoelectron spectroscopy) was used to analyze elements on a surface of an electrode plate of a lithium-ion battery after capacity grading. MgKa (1253.6 eV) and AlKa (1486.6 eV) targets were used to generate X-rays. PHI 5500 XPS (X-ray photoelectron spectroscopy with a detection depth of 10 nm) was used to analyze elemental composition on the surface of the positive and negative electrodes after capacity grading (discharging to 2.5 V at 0.2 C, randomly taking a 10×10 mm sample electrode plate, and soaking the sample electrode plate in dimethyl carbonate (DMC) for 30 min). Ten different regions of silicon-based negative electrode particles were randomly tested (F1s 686±5 eV, N1s 400±5 eV elements). The element composition was an average value based on ten test results.

Cycle Performance Test:

At temperatures of 25° C. and 45° C., respectively, the charging process is charging at a constant current of 0.7 C to 4.45 V, charging at a constant voltage to a cut-off current of 0.025 C, and then discharging at 0.5 C to 3.0 V. With a discharge capacity in the first cycle being 100%, a capacity retention rate of the lithium ion battery after 300 cycles was recorded.

A mass ratio of fluorine to sulfur in the surface layer of the positive electrode active material layer was A, and a mass ratio of fluorine to sulfur in the surface layer of the negative electrode active material layer was B.

Table 1 shows various parameters and evaluation results in Examples 1 to 15 and Comparative Examples 1 to 15.

TABLE 1

| Groups | Percentage of FEC contained in electrolyte 1 (wt %) | Total percentage of sulfur-containing compound contained in electrolyte 1 (wt %) | Percentage of FEC contained in electrolyte 2 (wt %) | Total percentage of sulfur-containing compound contained in electrolyte 2 (wt %) | B | A | B/A | Capacity retention rate after 300 cycles at 25° C. | Capacity retention rate after 300 cycles at 45° C. |
|---|---|---|---|---|---|---|---|---|---|
| Comparative Example 1 | / | / | 20 | 0 | No sulfur | No sulfur | No sulfur | 78% | 58% |
| Comparative Example 2 | / | / | 20 | 1 | 4 | 184 | 0.02 | 71% | 54% |
| Comparative Example 3 | / | / | 20 | 4 | 2 | 102 | 0.02 | 62% | 58% |
| Comparative Example 4 | 20 | 1 | 5 | 1 | 4 | 121 | 0.03 | 72% | 58% |
| Comparative Example 5 | 20 | 1 | 40 | 1 | 4 | 353 | 0.01 | 74% | 57% |
| Comparative Example 6 | 20 | 4 | 5 | 1 | 2 | 102 | 0.02 | 63% | 52% |
| Comparative Example 7 | 20 | 4 | 40 | 1 | 2 | 288 | 0.01 | 64% | 53% |
| Comparative Example 8 | 20 | 1 | 5 | 4 | 1 | 28 | 0.04 | 68% | 55% |
| Comparative Example 9 | 20 | 1 | 40 | 4 | 4 | 262 | 0.02 | 70% | 54% |
| Comparative Example 10 | 20 | 4 | 5 | 4 | 1 | 27 | 0.04 | 64% | 53% |
| Comparative Example 11 | 20 | 4 | 40 | 4 | 2 | 252 | 0.01 | 65% | 54% |
| Example 1 | 20 | 0 | 5 | 1 | 10 | 118 | 0.08 | 84% | 81% |
| Example 2 | 20 | 0 | 10 | 1 | 22 | 201 | 0.11 | 87% | 81% |
| Example 3 | 20 | 0 | 20 | 1 | 48 | 267 | 0.18 | 89% | 80% |
| Comparative Example 12 | 20 | 0 | 30 | 1 | 62 | 302 | 0.21 | 89% | 62% |
| Comparative Example 13 | 20 | 0 | 40 | 1 | 72 | 321 | 0.22 | 89% | 67% |
| Example 4 | 20 | 0 | 5 | 2 | 8 | 101 | 0.08 | 87% | 81% |
| Example 5 | 20 | 0 | 10 | 2 | 20 | 165 | 0.12 | 89% | 81% |
| Example 6 | 20 | 0 | 20 | 2 | 29 | 222 | 0.13 | 89% | 81% |
| Example 7 | 20 | 0 | 30 | 2 | 47 | 288 | 0.16 | 89% | 80% |
| Comparative Example 14 | 20 | 0 | 40 | 2 | 69 | 332 | 0.21 | 90% | 71% |
| Comparative Example 15 | 20 | 0 | 5 | 4 | 1 | 28 | 0.04 | 73% | 69% |
| Example 8 | 20 | 0 | 10 | 4 | 5 | 35 | 0.14 | 85% | 83% |
| Example 9 | 20 | 0 | 20 | 4 | 18 | 120 | 0.15 | 87% | 83% |
| Example 10 | 20 | 0 | 30 | 4 | 30 | 167 | 0.18 | 88% | 83% |
| Example 11 | 20 | 0 | 40 | 4 | 52 | 273 | 0.19 | 88% | 82% |
| Example 12 | 5 | 0 | 20 | 2 | 30 | 232 | 0.13 | 88% | 81% |
| Example 13 | 10 | 0 | 20 | 2 | 31 | 233 | 0.13 | 88% | 81% |
| Example 14 | 30 | 0 | 20 | 2 | 34 | 248 | 0.14 | 89% | 81% |
| Example 15 | 40 | 0 | 20 | 2 | 39 | 245 | 0.16 | 89% | 80% |

Table 2 shows various parameters and evaluation results in Examples 16 to 31 and Comparative Examples 16 to 23.

TABLE 2

| Groups | Percentage of FEC contained in electrolyte 1 (wt %) | Total percentage of sulfur-containing compound contained in electrolyte 1 (wt %) | Percentage of FEC contained in electrolyte 2 (wt %) | Total percentage of sulfur-containing compound contained in electrolyte 2 (wt %) | B | A | B/A | Capacity retention rate after 300 cycles at 25° C. | Capacity retention rate after 300 cycles at 45° C. |
|---|---|---|---|---|---|---|---|---|---|
| Comparative Example 16 | 20 | 1 | 5 | 1 | 4 | 138 | 0.03 | 67% | 63% |
| Example 16 | 20 | 0 | 5 | 1 | 8 | 107 | 0.07 | 82% | 80% |
| Example 17 | 20 | 0 | 20 | 4 | 17 | 141 | 0.12 | 85% | 84% |
| Comparative Example 17 | 20 | 1 | 5 | 1 | 3 | 99 | 0.03 | 61% | 53% |
| Example 18 | 20 | 0 | 5 | 1 | 7 | 101 | 0.07 | 81% | 80% |

TABLE 2-continued

| Groups | Percentage of FEC contained in electrolyte 1 (wt %) | Total percentage of sulfur-containing compound contained in electrolyte 1 (wt %) | Percentage of FEC contained in electrolyte 2 (wt %) | Total percentage of sulfur-containing compound contained in electrolyte 2 (wt %) | B | A | B/A | Capacity retention rate after 300 cycles at 25° C. | Capacity retention rate after 300 cycles at 45° C. |
|---|---|---|---|---|---|---|---|---|---|
| Example 19 | 20 | 0 | 20 | 4 | 15 | 88 | 0.17 | 83% | 81% |
| Comparative Example 18 | 20 | 1 | 5 | 1 | 4 | 141 | 0.03 | 70% | 68% |
| Example 20 | 20 | 0 | 5 | 1 | 20 | 152 | 0.13 | 85% | 81% |
| Example 21 | 20 | 0 | 20 | 4 | 33 | 182 | 0.18 | 85% | 82% |
| Comparative Example 19 | 20 | 1 | 5 | 1 | 2 | 155 | 0.01 | 58% | 53% |
| Example 22 | 20 | 0 | 5 | 1 | 14 | 103 | 0.14 | 82% | 80% |
| Example 23 | 20 | 0 | 20 | 4 | 20 | 141 | 0.14 | 82% | 80% |
| Comparative Example 20 | 20 | 1 | 5 | 1 | 3 | 162 | 0.02 | 66% | 62% |
| Example 24 | 20 | 0 | 5 | 1 | 21 | 152 | 0.14 | 82% | 81% |
| Example 25 | 20 | 0 | 20 | 4 | 28 | 163 | 0.17 | 83% | 80% |
| Comparative Example 21 | 20 | 1 | 5 | 1 | 4 | 183 | 0.02 | 72% | 58% |
| Example 26 | 20 | 0 | 5 | 1 | 23 | 201 | 0.11 | 83% | 80% |
| Example 27 | 20 | 0 | 20 | 4 | 28 | 101 | 0.28 | 84% | 81% |
| Comparative Example 22 | 20 | 1 | 5 | 1 | 4 | 166 | 0.02 | 62% | 52% |
| Example 28 | 20 | 0 | 5 | 1 | 15 | 113 | 0.13 | 83% | 81% |
| Example 29 | 20 | 0 | 20 | 4 | 15 | 103 | 0.15 | 85% | 81% |
| Comparative Example 23 | 20 | 1 | 5 | 1 | 2 | 99 | 0.02 | 63% | 60% |
| Example 30 | 20 | 0 | 5 | 1 | 9 | 88 | 0.10 | 84% | 81% |
| Example 31 | 20 | 0 | 20 | 4 | 10 | 92 | 0.11 | 84% | 83% |

In Comparative Examples 1 to 3, the films at the positive and negative electrodes were not formed separately. Comparative Example 1 did not include the sulfur-containing compound, causing the high-voltage positive electrode to fail, and especially at 45° C., the capacity retention rate was relatively poor. Although the sulfur-containing compound was added in Comparative Examples 2 and 3, the sulfur-containing compound deteriorated the stability of the SEI film on the surface of the negative electrode, and cycle performance is not good either. In Comparative Examples 4 to 11, although the films at the positive and negative electrodes were formed separately, the SEI film on the surface of the negative electrode was still deteriorated due to the sulfur-containing compound contained in the electrolyte 1, thereby affecting the cycle performance of the lithium ion battery. In addition, in Comparative Examples 1 to 11, B was all less than 5.

In Examples 1 to 15, the electrolyte 1 did not include the sulfur-containing compound, while the electrolyte 2 included the sulfur-containing compound, so that the surface layer of the negative electrode active material satisfied 5≤B≤50, and the surface layer of the positive electrode active material satisfied 30≤A≤300. In this case, the stability of the SEI film on the surface of the negative electrode and the stability of the CEI film on the surface of the positive electrode were balanced, and the cycle performance of the negative electrode combined with the high-voltage positive electrode could be maintained at a better level.

In Comparative Examples 12 to 15, although the films at the positive and negative electrodes were formed separately, and the electrolyte 1 did not include the sulfur-containing compound, the cycle performance at 45° C. in Comparative Examples 12 to 14 was still not good, and cycling degradation at 25° C. in Comparative Example 15 was also fast. For Comparative Examples 12 to 14, because the electrolyte 2 included excessive FEC, while the sulfur-containing compound was insufficient. It can be learned from elemental analysis that B>50 and A>300. The excessive FEC was easily oxidized at the high-voltage positive electrode, and therefore the performance of the positive electrode was deteriorated. The insufficient sulfur-containing compound could not effectively protect the stability of the surface of the positive electrode and caused the failure of the high-voltage positive electrode. The failure of the high-voltage positive electrode was more pronounced during the cycling process at 45° C., thus showing fast cycling degradation at 45° C. Comparative Example 15 was just the opposite. The percentage of the sulfur-containing compound in the electrolyte 2 was too high, while the percentage of FEC was too low. It can be learned from elemental analysis that B≤5 and A≤30. The percentage of the sulfur-containing compound was too high, and there is still the sulfur-containing compound reduced on the surface of the negative electrode during SEI repair in the cycling process of the negative electrode, deteriorating the SEI film on the surface of the negative electrode. However, the insufficient FEC could not effectively repair, in a timely manner, the SEI film damaged during cycling, deteriorating the cycling of the negative electrode.

In addition, it can be learned from the comparison between Examples 1 to 15 and Comparative Examples 1 to 15 that the cycling capacity retention rates at 20° C. and 45° C. are better by making 0.05≤B/A≤0.2.

It can be learned from Table 2 that conclusions consistent with the above can be obtained when other fluorine-containing compounds were used to replace FEC and other sulfur-containing compounds were used to replace 1,3-propane sultone.

The above descriptions are only preferred embodiments of this application and explanations of the applied technical principles. Those skilled in the art should understand that the scope of disclosure involved in this application is not limited to the technical solutions formed by the specific combination of the above technical features, and should also cover other technical solutions formed by any combination of the above technical features or their equivalent features without departing from the above disclosed concept. For example, the technical solution formed by replacement between the above features and the technical features having similar functions disclosed in this application.

What is claimed is:

1. An electrochemical apparatus, comprising:
a positive electrode plate comprising a positive electrode active material layer;
a negative electrode plate comprising a negative electrode active material layer; a separator disposed between the positive electrode plate and the negative electrode plate; and an electrolyte,
wherein a mass ratio of fluorine to sulfur in a surface layer of the positive electrode active material layer is A, and a mass ratio of fluorine to sulfur in a surface layer of the negative electrode active material layer is B, wherein 30≤A≤300, and 5≤B≤50.

2. The electrochemical apparatus according to claim 1, wherein 0.05≤B/A≤ 0.2.

3. The electrochemical apparatus according to claim 1, wherein a thickness of the surface layer of the positive electrode active material layer is 10 nm, and a thickness of the surface layer of the negative electrode active material layer is 10 nm.

4. The electrochemical apparatus according to claim 1, further comprising an electrolyte, and the electrolyte comprises at least one of a fluorine-containing compound or a sulfur-containing compound.

5. The electrochemical apparatus according to claim 4, wherein the electrolyte comprises the fluorine-containing compound and the fluorine-containing compound comprises at least one of fluorocarbonate, trifluoropropylene carbonate, trifluoroethyl methyl carbonate, fluorocarboxylate, or fluoroether.

6. The electrochemical apparatus according to claim 4, wherein the electrolyte comprises the sulfur-containing compound and the sulfur-containing compound comprises at least one of 1-propenyl-1,3-sulfonate, or 1,3-propane sultone.

7. The electrochemical apparatus according to claim 1, wherein the negative electrode plate comprises a negative electrode active material; the negative electrode active material comprises a silicon material; and the silicon material comprises at least one of silicon, a silicon-oxygen compound, a silicon-carbon compound, or a silicon alloy.

8. The electrochemical apparatus according to claim 1, wherein the positive electrode plate comprises a positive electrode active material; and the positive electrode active material comprises at least one of lithium cobalt oxide, lithium nickel cobalt manganese oxide, or lithium nickel cobalt aluminum oxide, and when a state of charge of the electrochemical apparatus is 100%, an open-circuit voltage of the electrochemical apparatus is greater than or equal to 4.15 V.

9. The electrochemical apparatus according to claim 8, wherein the positive electrode active material comprises lithium cobalt oxide, and when the state of charge of the electrochemical apparatus is 100%, the open-circuit voltage of the electrochemical apparatus is greater than or equal to 4.35 V.

10. An electronic apparatus, comprising an electrochemical apparatus, the electrochemical apparatus comprising:
a positive electrode plate comprising a positive electrode active material layer;
a negative electrode plate comprising a negative electrode active material layer;
a separator disposed between the positive electrode plate and the negative electrode plate; wherein a mass ratio of fluorine to sulfur in a surface layer of the positive electrode active material layer is A, and a mass ratio of fluorine to sulfur in a surface layer of the negative electrode active material layer is B, wherein 30≤A≤300, and 5≤B≤50.

11. The electronic apparatus according to claim 10, further comprising an electrolyte, and the electrolyte comprises at least one of a fluorine-containing compound or a sulfur-containing compound.

12. The electronic apparatus according to claim 11, wherein the electrolyte comprises the fluorine-containing compound and the fluorine-containing compound comprises at least one of fluorocarbonate, trifluoropropylene carbonate, trifluoroethyl methyl carbonate, fluorocarboxylate, or fluoroether.

13. The electronic apparatus according to claim 11, wherein the electrolyte comprises the sulfur-containing compound and the sulfur-containing compound comprises at least one of ethylene sulfite, vinyl sulfate, butane sultone, I-propenyl-1,3-sulfonate, or 1,3-propane sultone.

14. The electronic apparatus according to claim 10, wherein the negative electrode plate comprises a negative electrode active material; the negative electrode active material comprises a silicon material; and the silicon material comprises at least one of silicon, a silicon-oxygen compound, a silicon-carbon compound, or a silicon alloy.

15. The electronic apparatus according to claim 10, wherein the positive electrode plate comprises a positive electrode active material; and the positive electrode active material comprises at least one of lithium cobalt oxide, lithium nickel cobalt manganese oxide, or lithium nickel cobalt aluminum oxide, and when a state of charge of the electrochemical apparatus is 100%, an open-circuit voltage of the electrochemical apparatus is greater than or equal to 4.15 V.

16. The electronic apparatus according to claim 10, wherein the positive electrode active material comprises lithium cobalt oxide, and when the state of charge of the electrochemical apparatus is 100%, the open-circuit voltage of the electrochemical apparatus is greater than or equal to 4.35 V.

17. A method for preparing an electrochemical apparatus, according to claim 1 comprising the steps of:
pre-lithiating a negative electrode plate of the electrochemical apparatus;
adding a first electrolyte to the electrochemical apparatus to perform a first formation, wherein the first electrolyte comprises a first fluorine-containing compound; and
adding a second electrolyte to the electrochemical apparatus and charging to obtain a second formation, wherein the second electrolyte comprises a second fluorine-containing compound and a sulfur-containing compound.

18. The method according to claim 17, wherein
based on a mass of the first electrolyte, a mass percentage of the first fluorine-containing compound is 5% to 40%; and/or
based on a mass of the second electrolyte, a mass percentage of the second fluorine-containing compound is 5% to 40%; and/or based on a mass of the second electrolyte, a mass percentage of the sulfur-containing compound is 1% to 6%.

19. The electronic apparatus according to claim 10, wherein a thickness of the surface layer of the positive electrode active material layer is 10 nm, and a thickness of the surface layer of the negative electrode active material layer is 10 nm.

20. The electronic apparatus according to claim 10, wherein $0.05 \leq B/A \leq 0.2$.

* * * * *